(12) United States Patent
Teijido et al.

(10) Patent No.: US 7,791,684 B2
(45) Date of Patent: Sep. 7, 2010

(54) SPATIAL LIGHT MODULATOR DISPLAY

(75) Inventors: Juan Manuel Teijido, Karlsruhe (DE);
Olivier Ripoll, Rueschlikon (CH);
Nadin Roesler, BP Eindhoven (NL);
Takeo Arai, Saitama (JP)

(73) Assignee: SONY Deutschland GmbH, Berlin (DE)

( * ) Notice: Subject to any disclaimer, the term of this patent is extended or adjusted under 35 U.S.C. 154(b) by 107 days.

(21) Appl. No.: 12/029,875

(22) Filed: Feb. 12, 2008

(65) Prior Publication Data

US 2008/0239203 A1    Oct. 2, 2008

(30) Foreign Application Priority Data

Mar. 31, 2007   (EP) .................................. 07006793

(51) Int. Cl.
*G02F 1/13357* (2006.01)
*F21V 7/04* (2006.01)

(52) U.S. Cl. .......................... 349/65; 362/608; 362/609; 362/628

(58) Field of Classification Search .................... 349/65; 362/608–609, 628
See application file for complete search history.

(56) References Cited

U.S. PATENT DOCUMENTS

| 5,542,017 A | 7/1996 | Koike |
| 6,979,095 B2 * | 12/2005 | Min et al. ................... 362/611 |

FOREIGN PATENT DOCUMENTS

WO    WO 03/056876 A2    7/2003

* cited by examiner

*Primary Examiner*—Jerry T Rahll
(74) *Attorney, Agent, or Firm*—Oblon, Spivak, McClelland, Maier & Neustadt, L.L.P.

(57) ABSTRACT

An optical device for backlighting a liquid crystal display. The optical device has an optical element. The optical element includes a material body and at least one recess. The recess is formed in the material body and is configured to determine the light distribution of light to be directed towards the liquid crystal display.

19 Claims, 15 Drawing Sheets

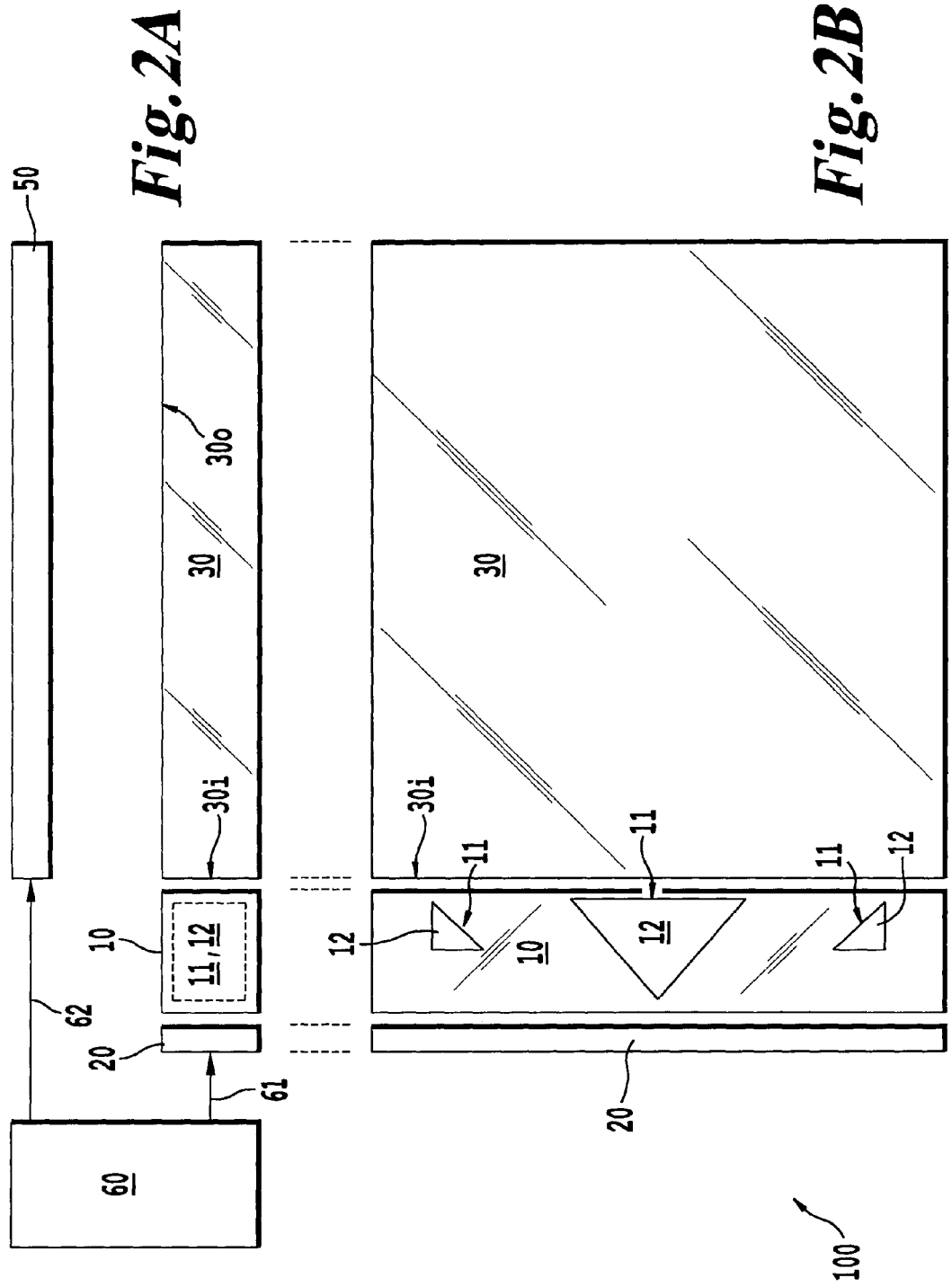

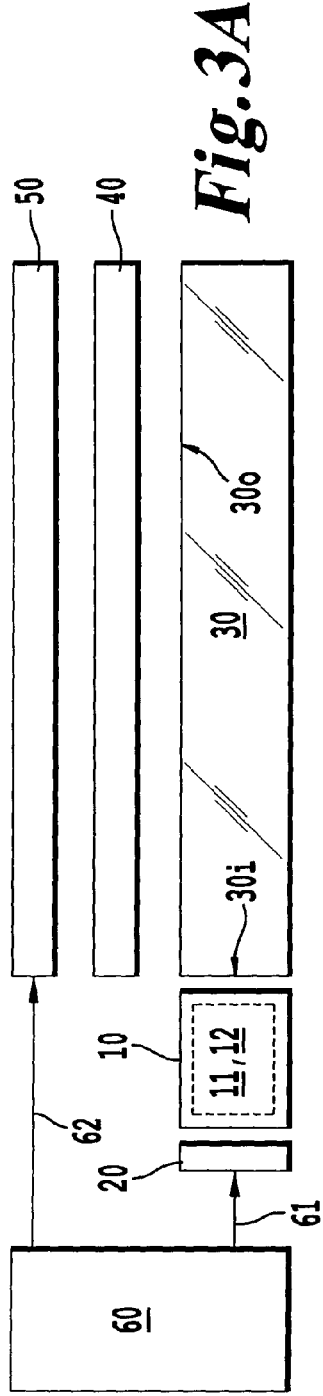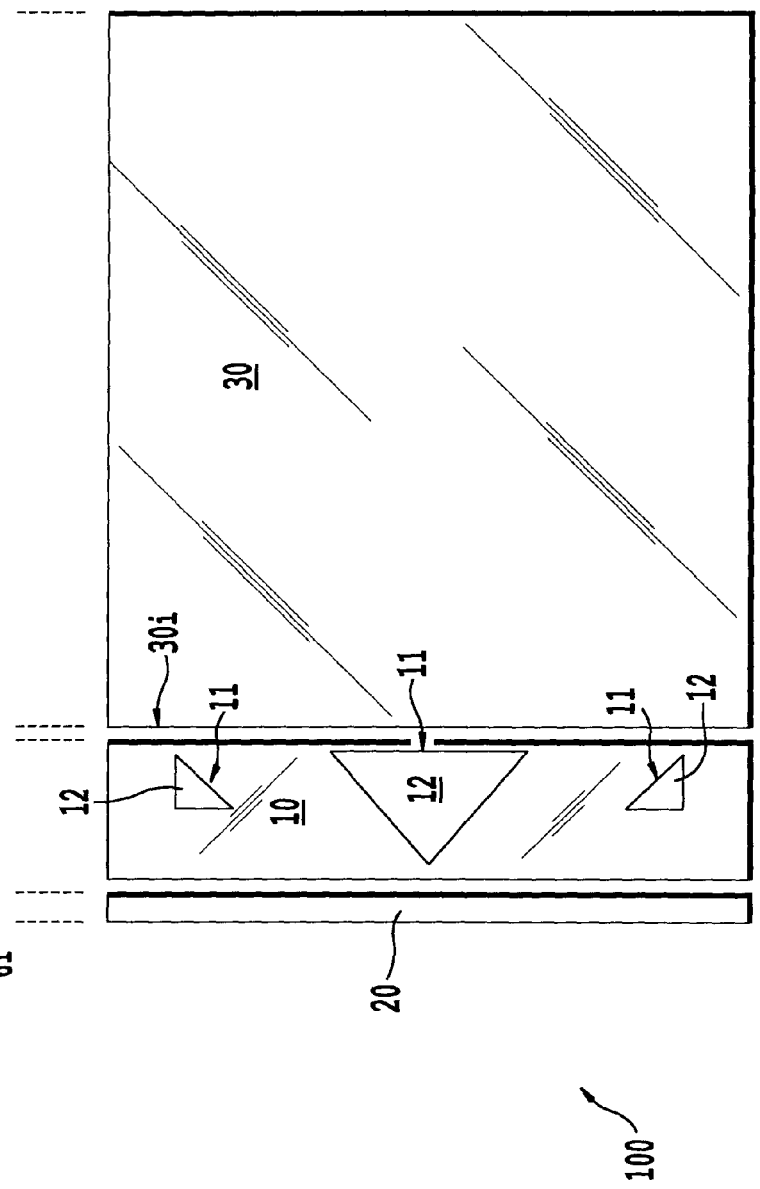

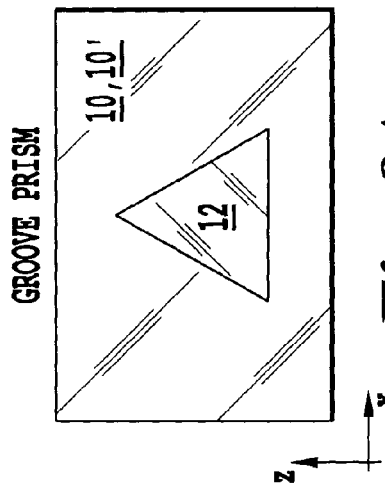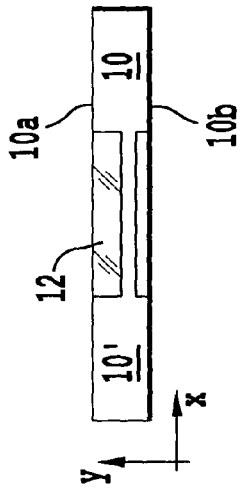
*Fig. 8A*     *Fig. 8B*
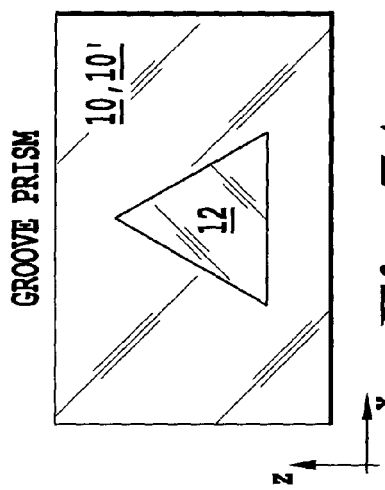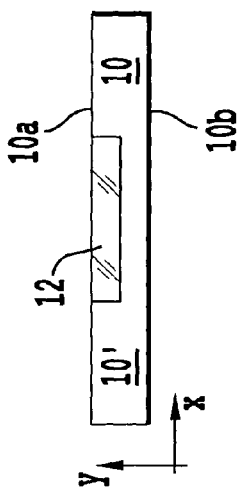
*Fig. 7A*     *Fig. 7B*
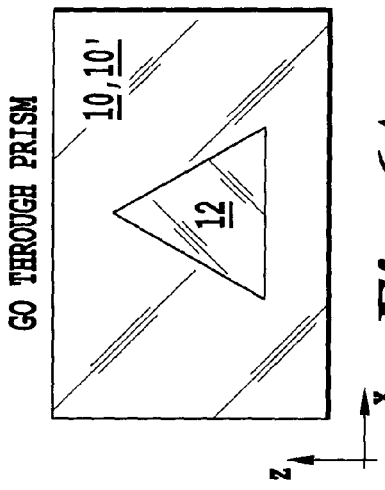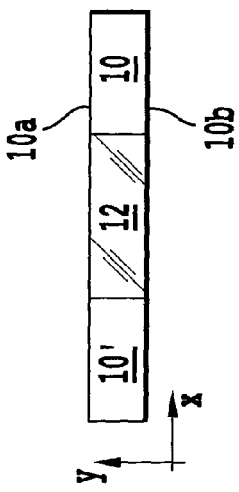
*Fig. 6A*     *Fig. 6B*

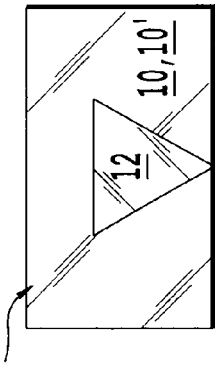
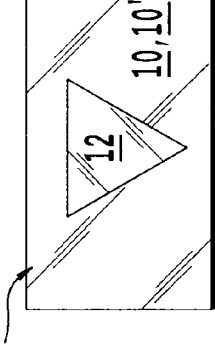
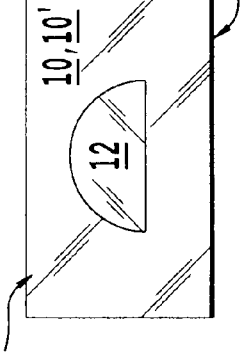
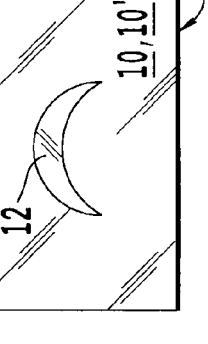

| FRONT BLOCK | | MIDDLE BLOCK LEFT | | SIDE BLOCK LEFT | | FRESNEL BLOCK | | SUBSTRATE | |
| --- | --- | --- | --- | --- | --- | --- | --- | --- | --- |
| x | y | x | y | x | y | x | y | x | y |
| -0.0135 | 0 | -0.7992 | 1.5698 | -2.5154 | 1.3047 | -2.7 | 3 | 3 | 0 |
| 0.0135 | 0 | -0.1784 | 1.0189 | -2.1254 | 1.2068 | -2.7 | 2.37 | 6 | 3 |
| 0.9033 | 0.8304 | -0.3742 | 2.1429 | -2.0464 | 1.352 | -1.8 | 2.7 | -6 | 3 |
| -0.9033 | 0.8304 | -0.7992 | 2.1429 | -1.5221 | 1.9316 | -1.8 | 2.37 | -3 | 0 |
| | | | | -2.6118 | 2.159 | -0.9 | 2.7 | | |
| | | | | | | -0.9 | 2.37 | | |
| | | MIDDLE BLOCK RIGHT | | SIDE BLOCK RIGHT | | 0 | 2.7 | | |
| | | x | y | x | y | 0.9 | 2.37 | | |
| | | 0.7992 | 1.5698 | 2.5154 | 1.3047 | 0.9 | 2.7 | | |
| | | 0.1784 | 1.0189 | 2.1254 | 1.2068 | 1.8 | 2.37 | | |
| | | 0.3742 | 2.1429 | 2.0464 | 1.352 | 1.8 | 2.7 | | |
| | | 0.7992 | 2.1429 | 1.5221 | 1.9316 | 2.7 | 2.37 | | |
| | | | | 2.6118 | 2.159 | 2.7 | 3 | | |

*Fig. 14*

SPATIAL LIGHT MODULATOR DISPLAY

The invention relates to a spatial light modulator display, to a liquid crystal display device and to a method for backlighting a liquid crystal display.

BACKGROUND

Nowadays, display devices comprising liquid crystal displays become more and more important, for instance in the field of electronic customer devices or the like. In such display devices the illumination and its uniformity with respect to a liquid crystal display may be important depending on the application scenario.

It is an object of the present invention to provide an optical device for backlighting a liquid crystal display, a liquid crystal display device, and a method for backlighting a liquid crystal display.

The object is solved by an optical device, a liquid crystal display device, and a method for backlighting a liquid crystal display according to claims 1, 18, and 19, respectively.

Further details of the present invention will become apparent from a consideration of the drawings and the ensuing description.

BRIEF DESCRIPTION OF THE SEVERAL VIEWS OF THE DRAWINGS

FIGS. 2A, 2B are schematic diagrams elucidating a further embodiment of the present invention by means of a side view and a top view, respectively.

FIGS. 3A, 3B are schematic diagrams elucidating a further embodiment of the present invention by means of a side view and a top view, respectively.

FIGS. 6A, 6B, 7A, 7B, 8A, 8B demonstrate by means of schematical top views and side views embodiments of possible recesses.

FIGS. 8C to 8J demonstrate by means of schematical top views embodiments of possible recesses.

FIGS. 13, 14 demonstrate by means of a schematic top view and by means of a tabular geometrical properties of a further embodiment of the present invention.

DETAILED DESCRIPTION

In the following, embodiments of the present invention are described. It is important to note that all described embodiments and the technical features may be combined in any way. There is no limitation with respect to the combination of certain described embodiments and the technical features with respect to other embodiments or technical features.

Figure 1A:
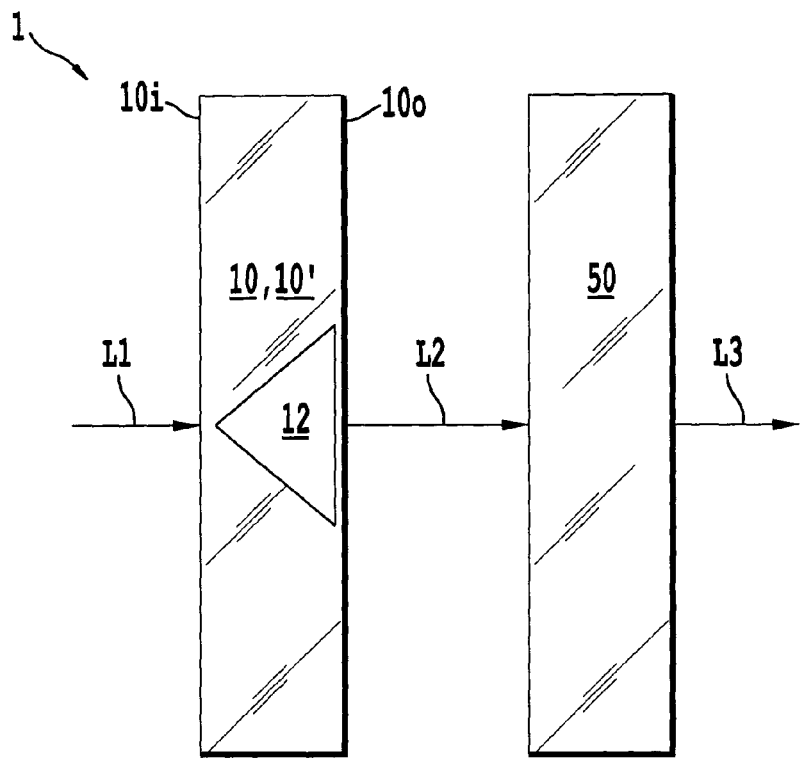
FIG. 1A is a schematic diagram of an embodiment of the present invention.

FIG. 1A shows an optical device 1 and a liquid crystal display 50. Optical device 1 may also be referred to as an illuminator or illumination unit for backlighting liquid crystal display 50 or as a spatial light modulator display. FIG. 1A further shows an optical element 10 that may be referred to as primary optics. The mentioned light guide 30 may be referred to as a light re-distributing and re-directing means. The mentioned second optical element 40 may be referred to as a second light re-distributing and re-directing means. The light L1 which is generated and emitted by a light source 20 may be referred to as primary light, primary illumination light or light of a first kind. Said first part of said light L1 may be referred to as secondary light L2 or as light of a second kind L2. Said second part of said light L1 may be referred to as tertiary illumination light L3 or as light of a third kind L3.

FIG. 1A shows an optical device 1 for backlighting a liquid crystal display 50. The optical device comprises an optical element 10 which is designed in order to receive light L1 and to transmit a first part of said light L1 towards said liquid crystal display 50. Said received light L1 has a first light distribution. Said first part of said light L1 has or is formed to have a second light distribution. Said second light distribution is designed to be more uniform than said first light distribution. Therefore, said optical element 10 includes a material body 10' and at least one recess 12 which is formed in said material body 10' and which is configured to determine said second light distribution based on a redistribution of said first light distribution of said first part of said light L1.

In order to adapt the second light distribution, said redistribution of said first light distribution may be made dependent on certain interaction processes, e.g. on refraction, reflection, and/or total internal reflection of said light L1 at interfaces between said material body 10' and said at least one recesses 12.

Said material body 10' may therefore be located before said light input interface 30i.

A single or a plurality of recesses 12 may be provided. The recesses 12 may be formed as a prism. Said recesses 12 may have a triangular or other closed polygonal shape, i.e. base or base face having a respective a triangular or other closed polygonal shape.

The recesses may have certain compositions from the material point of view. Said recesses 12 may be evacuated, may be filled with a gas, or may be filled with a material which is at least partly transparent to said light L1 and which has a refraction index $n_{recess}$ which is below the refraction index $n_{body}$ of the material body 10'.

The one or plurality of recesses may be positioned differently with respect to said material body 10' of said optical element 10 or said primary optics 10, e.g. with respect to an upper surface 10a and a lower surface 10b of said material body 10'. Said recess 12 may be formed as a groove on at least one of said upper and lower surfaces 10a, 10b, as a recess extending between said upper and lower surfaces 10a, 10b, as a recess in the interior of said material body 10' spatially separated from said upper and lower surfaces 10a, 10b. At least one recess may be formed as a Fresnel block 12f.

The material body 10' as such may also have different forms, e.g. a form in square or trapezoidal shape.

Thus, in FIG. 1A an optical device 1 for backlighting a liquid crystal display 50 is shown. The optical device 1 comprises an optical element 10. The optical element 10 receives light L1 as light of a first kind or as primary illumination light.

Said light L1 irradiates the optical element 10 and its material body 10'. In addition, the optical element 10 also comprises at least one recess 12. The recess 12 is formed in said material body 10'. The received light L1 has a certain light distribution. Via interaction of said light L1 with the material body 10' and said at least one recess 12 at least a part of said received light L1 is modified with respect to its light distribution and transmitted to said liquid crystal display 50, namely as light of a second kind or secondary illumination light L2. Said at least one recess 12 may be formed in said material body 10' and is configured to determined the light distribution of the secondary illumination light L2, namely of the light directed towards the liquid crystal display 50, based on a redistribution of the light distribution of the incoming light.

Figure 1B:
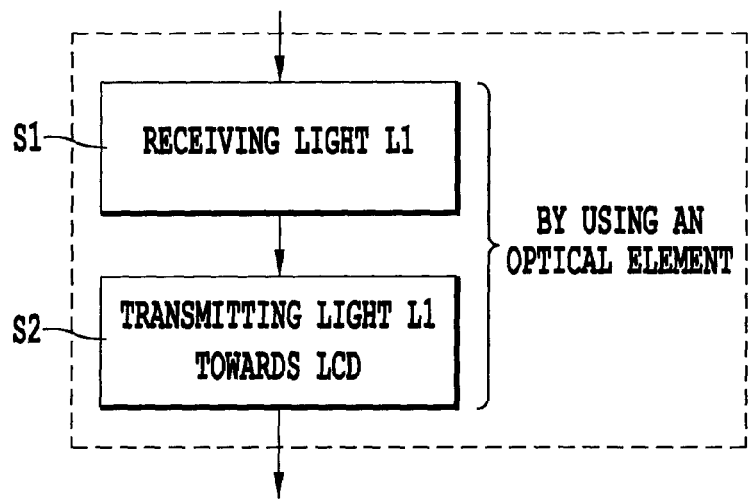
FIG. 1B is a flow chart of an embodiment of a method for backlighting a liquid crystal display.

As shown in FIG. 1B a method for backlighting a liquid crystal display 50 may comprise a step S1 of receiving light L1 having a first light distributing and a step S2 of transmitting a first part of said light L1 towards said liquid crystal display 50.

In an embodiment of such a method, an optical element 10 may be used which is designed in order to receive said light L1 and to transmit said first part of said light L1 towards said liquid crystal display 50. The optical element 10 may be designed as described above or below.

FIG. 1B, thus, shows a method for backlighting a liquid crystal display 50. In the first step S1 light L1 is received. Said received light L1 is then in step S2 transmitted towards a liquid crystal display 50. In this embodiment of a method for backlighting a liquid crystal display 50 an optical element 10 is used which is adapted in order to receive said light L1 and to transmit a first part of said light L1 towards said liquid crystal display 50. Said light L1 has a first light distribution and said first part of said light L1 is designed to have a second light distribution, which is more uniform than said first light distribution. By using an optical element 10 which has a material body 10' and at least one recess 12 said second light distribution is determined and formed based on a redistribution of said first light distribution of said first part of said light L1.

As shown in FIGS. 2A and 2B, according to a further embodiment of the present invention a light guide 30 may be provided which has a light input interface 30i and a light output interface 30o. Said light guide 30 is configured to receive said first part of said light L1 through said light input interface 30i and to transmit a second part of said light L1—which is a part of said first part of said light L1—towards said liquid crystal display 50 through said light output interface 30o.

A light source 20 configured to generate said light L1 may be provided. Then, said optical element 10 may be configured to receive said light L1 from said light source 20 and to illuminate said liquid crystal display 50. Said light source (20) may comprise at least one of light emitting diode.

FIGS. 2A and 2B, thus, demonstrate by means of a schematic side view and a schematic top view, respectively, an embodiment of the optical device 1 for backlighting a liquid crystal display 50. According to this embodiment, a light guide 30 is provided having a light input interface 30i and a light output interface 30o. The primary optics represented by said optical element 10 comprises a plurality of recesses 12 forming an arrangement or assembly 11 of recesses 12. In addition a light source 20 is shown. The light source 20 as well as the liquid crystal display 50 may be controlled by means of a controlling unit 60 and via control lines 61 and 62, respectively.

As shown in FIG. 3 (FIGS. 3A and 3B), an additional second optical element 40 may be provided, which is configured in order to enhance the brightness or to make uniform the light distribution of received light.

The embodiment shown in FIGS. 3A and 3B comprises as secondary optics a second optical element 40 which receives the light transmitted by the light guide 30 towards the liquid crystal display 50 for intermediate processing or interaction in order to enhance the brightness and improve the uniformity of the light distribution before illuminating the liquid crystal display 50.

Figure 4:
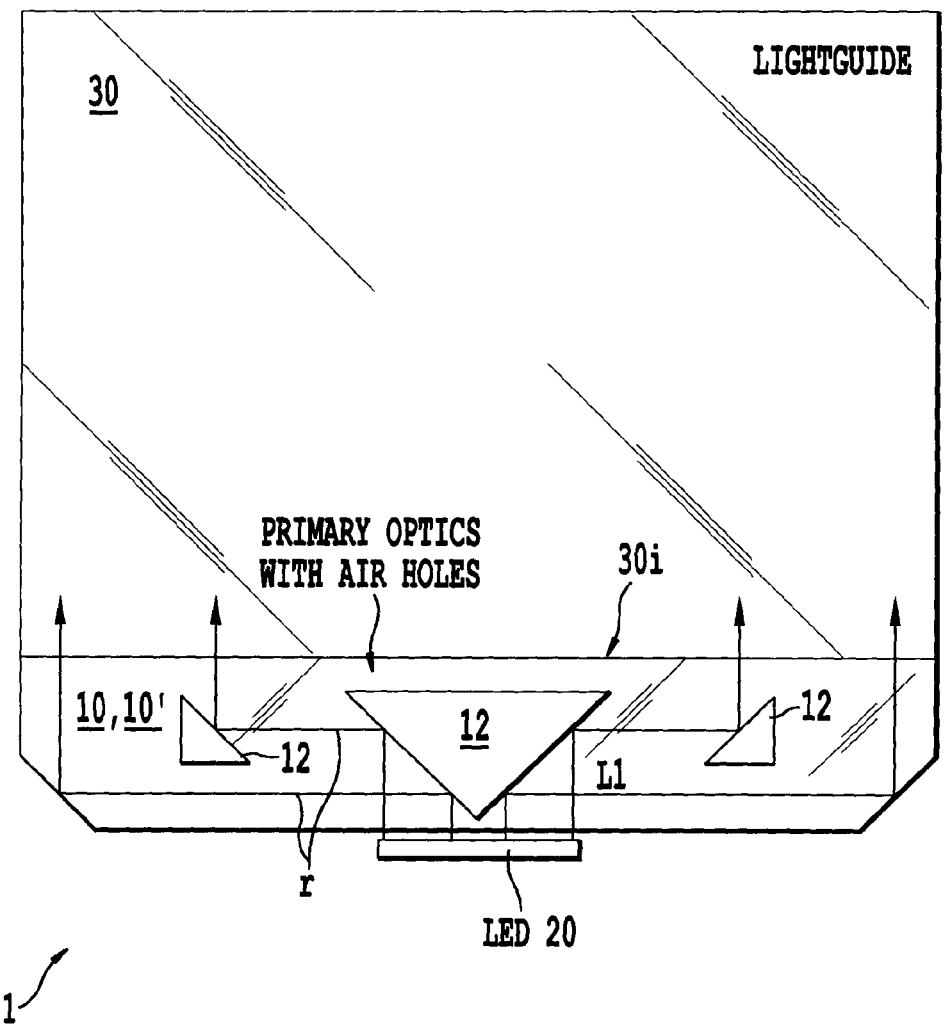
FIGS. 4, 5 demonstrate by means of a top view the optical path for several beams of light in an embodiment of the present invention.
Figure 5:
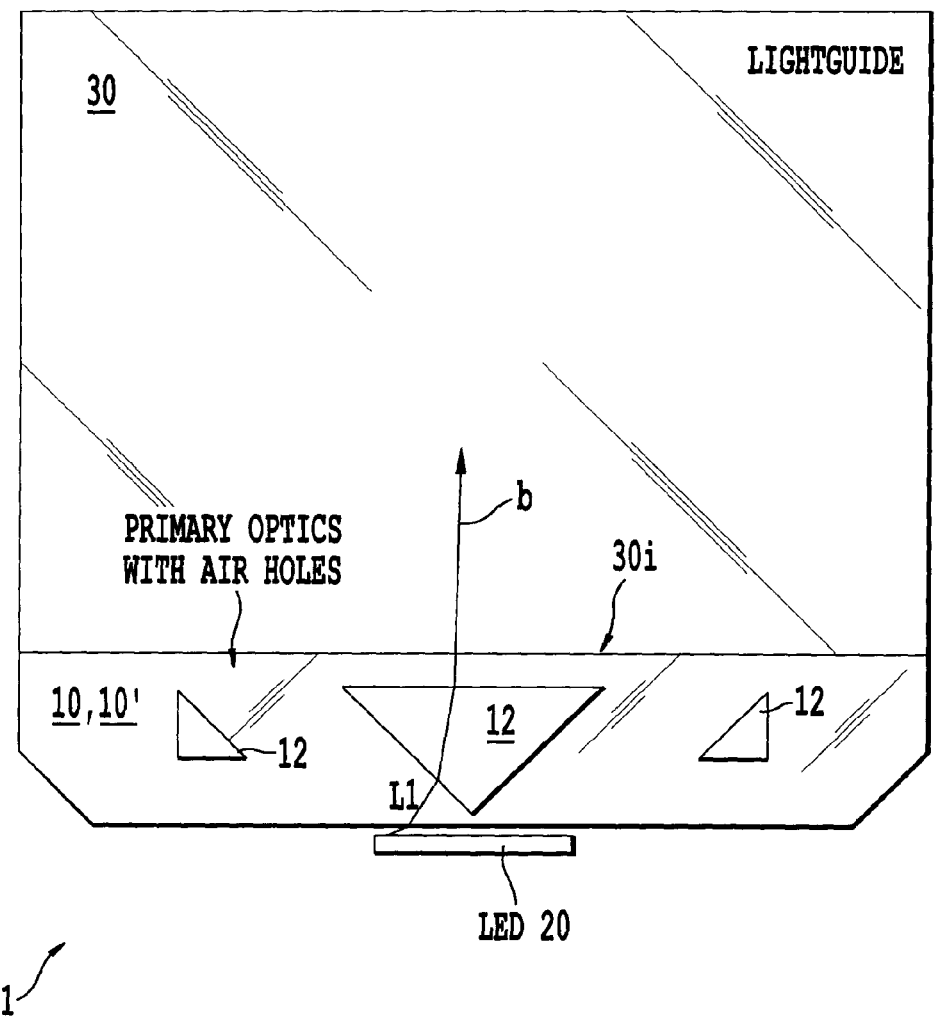

FIGS. 4 and 5 demonstrate by means of schematic top views the interaction of rays of light or of light beams at interfaces of the recesses 12 within the material body 10' of the primary optics or optical element 10.

FIG. 4 therefore demonstrates optical paths of rays of light which are reflected at interfaces between the material body 10' and the recesses 12 or the exterior environment of the optical device 1.

FIG. 5 demonstrates the influence of the paths of rays of light by means of refraction at interfaces between the material body 10' of the optical element 10 and the recesses 12 formed therein.

FIGS. 6A, 6B, 7A, 7B, 8A and 8B demonstrate by means of schematic top views (A) and by means of schematic side views (B) different embodiments for recesses 12 formed in the material body 10' of the optical element 10.

FIG. 6 therefore shows a recess 12 formed as a so-called punch-through section or go-through prism which extends from an upper face 10a to a lower face 10b of the material body 10'.

FIG. 7 demonstrates a recess 12 as a groove formed on the upper face 10a of the material body 10', namely as a groove prism.

In FIGS. 8A and 8B, the recess 12 is formed as a combination of two single recesses formed as groove prisms or as grooves on the surfaces 10a and 10b of the material body 10' of the optical element 10.

FIGS. 8C to 8J demonstrate by means of schematical top views embodiments of possible recesses 12 as well as their positions on or in said material body 10' of the optical element 10 with respect to a light input face 10i and a light output face 10o thereof.

In the embodiments of FIGS. 8C to 8F triangular prisms are employed, either essentially or completely separated from the light input face 10i and the light output face 10o of the optical element 10 as shown in FIGS. 8C and 8E or in the vicinity of the optical element's 10 boundary, e.g. the light input face 10i thereof, as shown in FIGS. 8D and 8F. In FIGS. 8C and 8D a corner of the triangle of the prism is directed to the light input face 10i. In FIGS. 8E and 8F an edge (side face) of the triangle of the prism is directed to the light input face 10i.

FIGS. 8G to 8J show further possible shapes of recesses 12 having the shape of a part, a section, an intersection, or a segment of a circle.

In each case, the recesses 12 may be essentially or completely spatially separated from the material body's 10 boundaries. The recesses may be connected or in the vicinity or even partly integrated in at least one boundary of the material body 10', e.g. the light input face 10i and or the light output face 10o thereof.

FIGS. 9, 10 and 11, 12 demonstrate more details of further embodiments of optical devices 1 for backlighting a liquid crystal display 50 comprising in each case an optical element 10 as primary optics and a light guide 30. Each material body 10' of a respective optical element 10 comprises the variety of recesses 12 formed in the material body 10' of the optical element 10 as an arrangement 11 of recesses 12.

Figure 10:
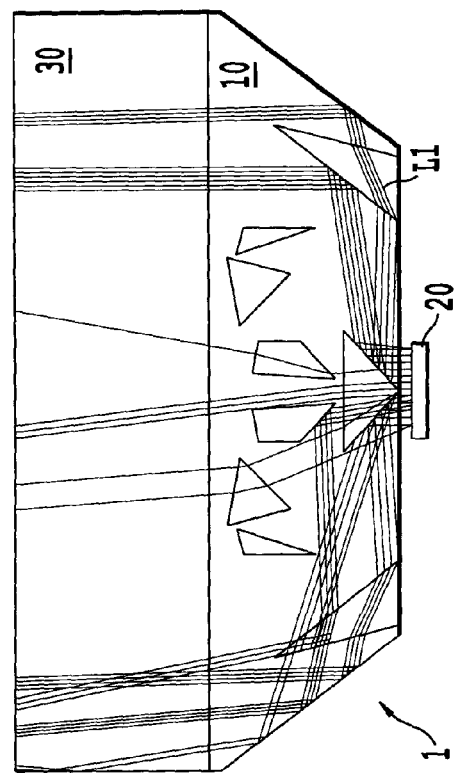
FIGS. 9, 10 demonstrate by means of a schematic top view a further embodiment of the present invention.
Figure 9:
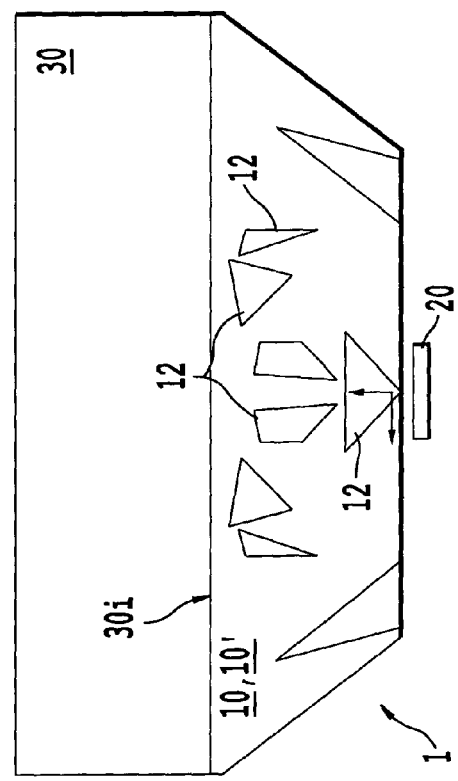
Figure 12:
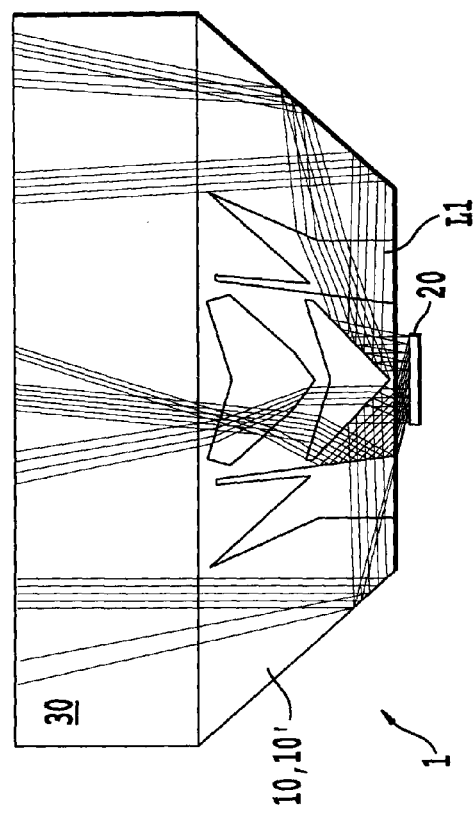
FIGS. 11, 12 demonstrate by means of a schematic top view a further embodiment of the present invention.
Figure 11:
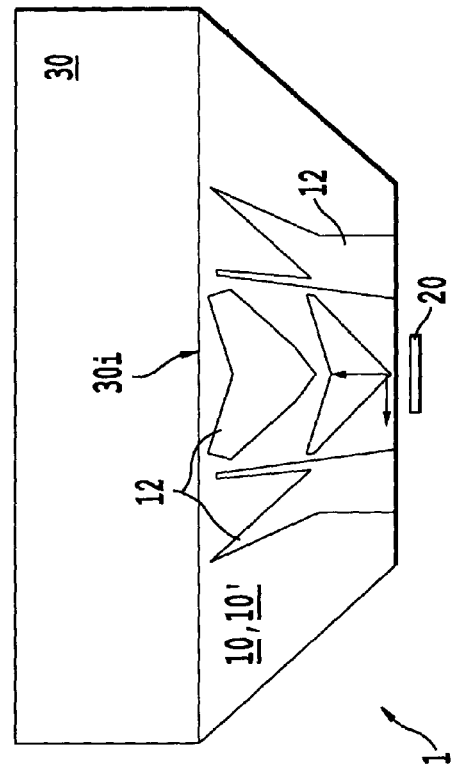

FIGS. 9 and 11 purely demonstrate the geometrical relationship, whereas FIGS. 10 and 12 demonstrate the optical paths for different rays of light emitted by and received from a provided light source 20.

Figure 13:
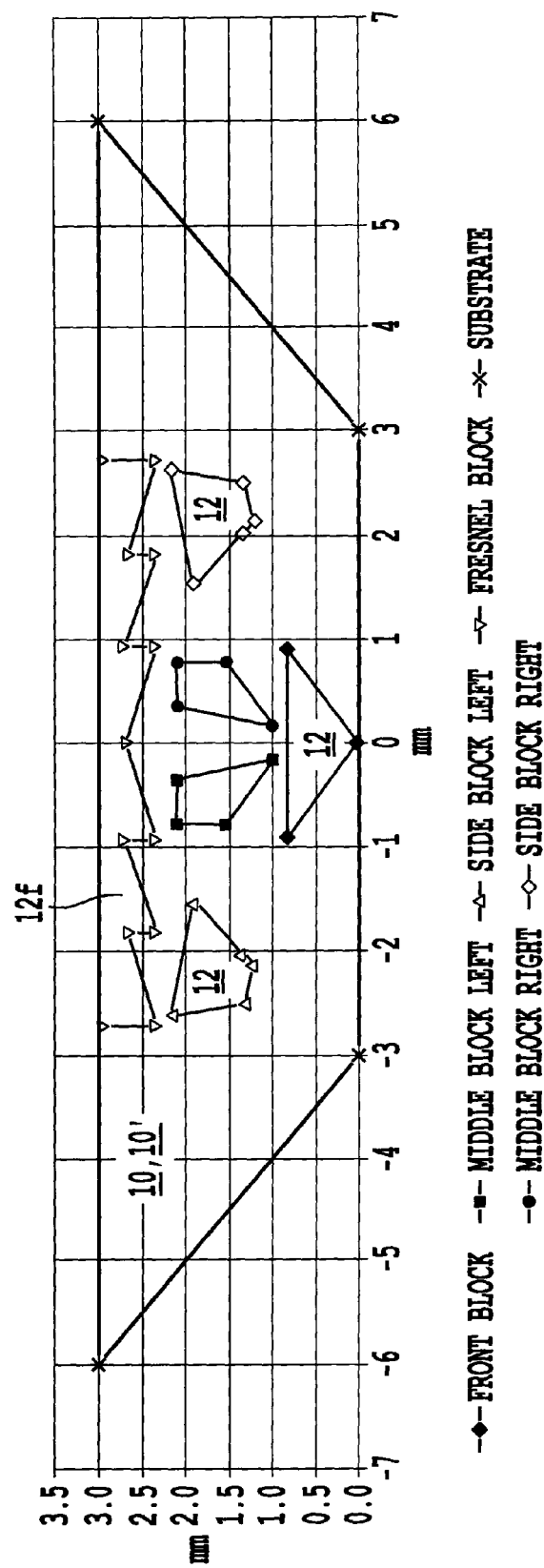

FIGS. 13 and 14 show another embodiment of an optical device 1 for backlighting a liquid crystal display 50. Here, in FIG. 13, the geometric relationship between the material body 10' and the provided recesses 12, formed as several sections within the material body 10 are demonstrated in a coordinate representation, where the points of the wedges are emphasized.

FIG. 14 gives the coordinates for the vertices or corners for the coordinate representation shown in FIG. 13.

Figure 15:
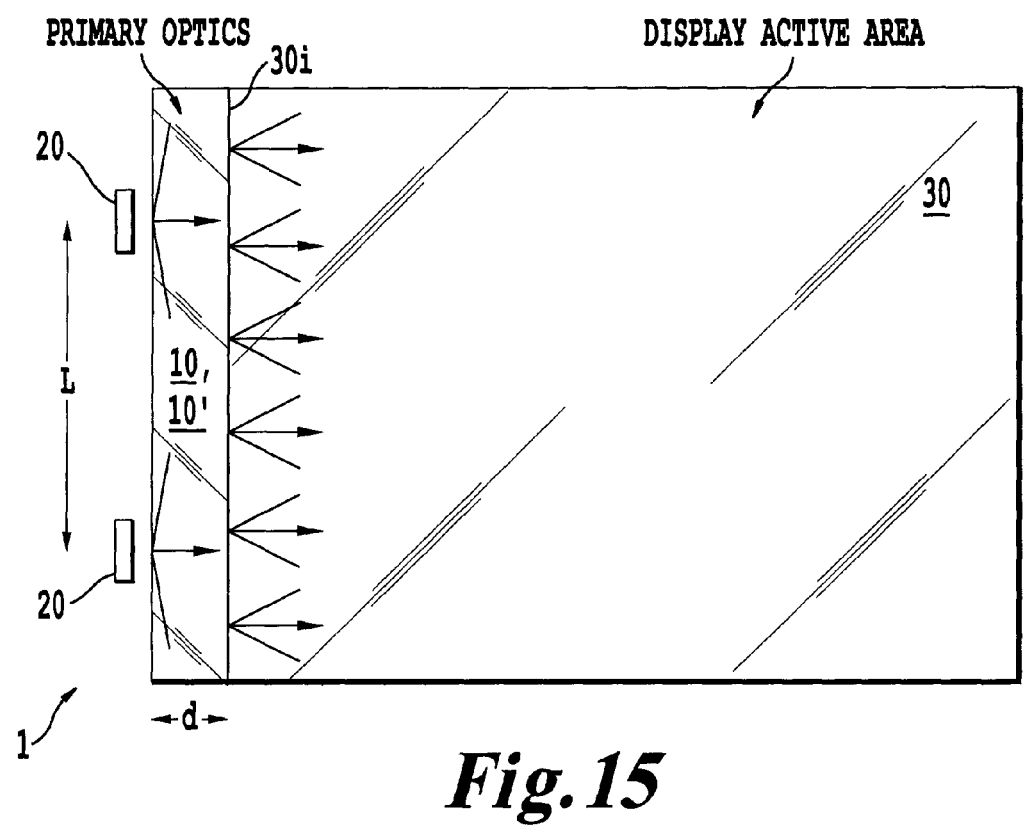
FIG. 15 demonstrates by means of a schematic top view further geometrical properties of another embodiment of the present invention.

FIG. 15 shows further geometrical parameters L and d which can be taken into account when designing embodiments of the optical device 10 for backlighting a liquid crystal display 50. L denotes the distance between a plurality of light sources 20 provided, and d denotes the thickness of the optical element 10 of the primary optics.

Figure 16:
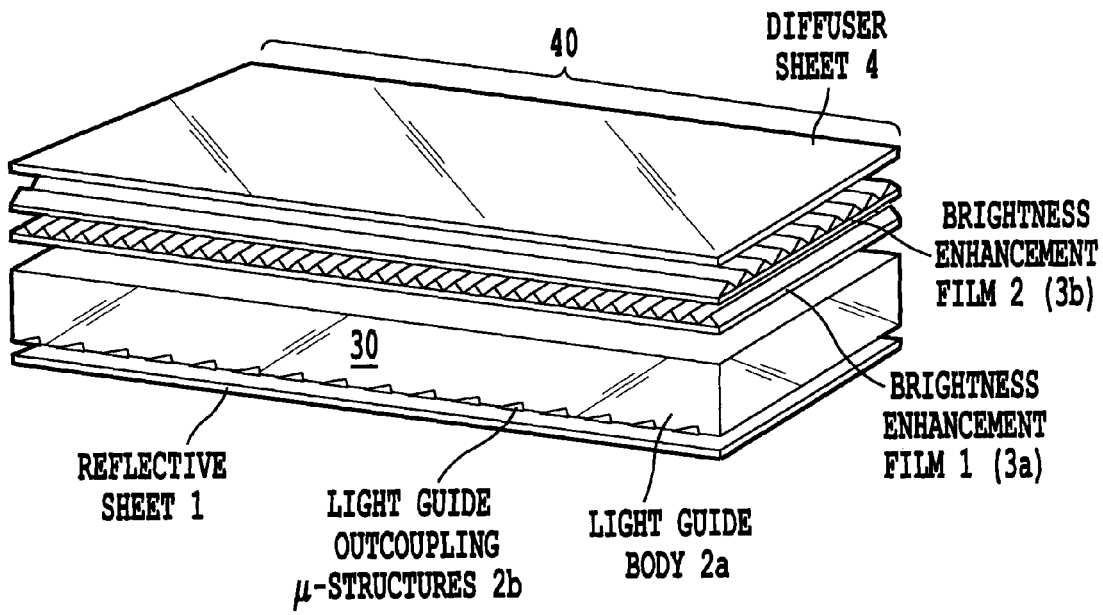
FIGS. 16, 17 are schematic perspective views of further optical means which may be adopted according to further embodiments of the present invention.
Figure 17:
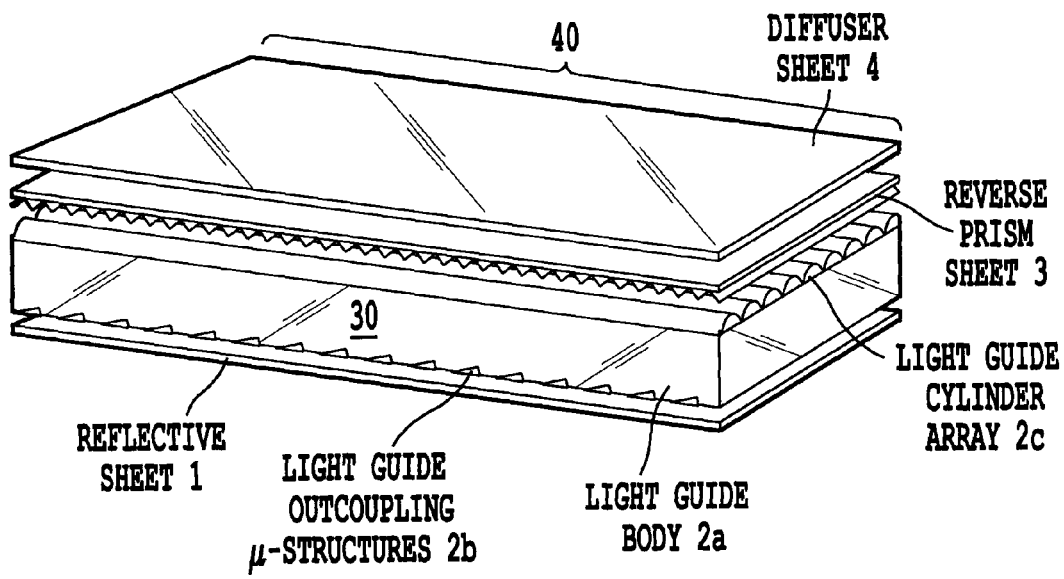
Figure 18:
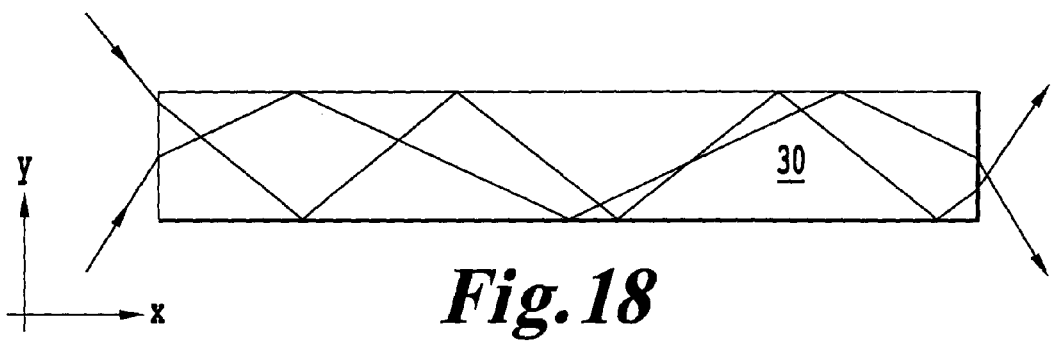
FIG. 18-24 demonstrate by means of schematic views further geometrical properties of embodiments of the present invention elucidating optical paths of several light beams.
Figure 19:
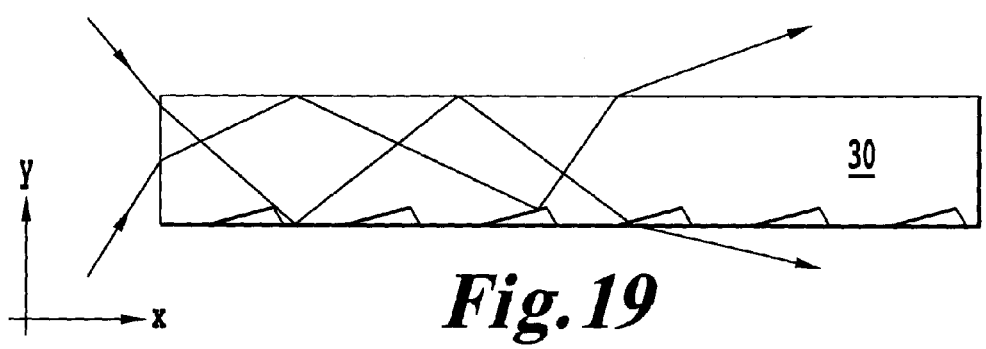

FIGS. 16 and 17 show combinations of a light guide 30 with additional measures in the form of a second optical element 40 which may be taken into account in order to further enhance the brightness and increase the uniformity of the light.

In the embodiments shown in FIGS. 16 and 17, the light guide 30 comprises at a face opposing the light output face 30o an out-coupling p-structure which is adapted for enhancing the reflection of light towards the light output face 30o of the light guide 30.

The second optical element 40 in each of the cases shown in FIGS. 16, 17 comprises a reflective sheet below the out-coupling p-structure and a diffusing sheet above the light output interface 30o.

In the embodiment of FIG. 16 between the light output interface 30o and the diffuser sheet said second optical element 40 comprises first and second brightness enhancement films. The embodiment shown in FIG. 17 comprises between the light output interface 30o and the diffuser sheet a cylinder array for the light guide and a reverse prism sheet which are both configured to further redistribute the light directed to the liquid crystal display 50.

FIGS. 18 to 23 demonstrate different measures which may be taken in order to influence the optical path for different rays of light within the light guide 30 by means of processes of reflection and refraction.

These and further aspects of embodiments of the present invention will also be elucidated by taking into account the following description:

According to a further embodiment of the present invention a thin illuminator for uniform display backlighting is provided.

The requirements of display backlighting are increasing in compactness, optical performance, uniformity efficiency, and cost point of view. Inter alia, an innovative optics is proposed which couples the light emitted by the LED into the light guide without producing any apparent bright spot.

As explained in FIG. 17, one aspect is to avoid bright spots produced by the cylinders in the reverse prism configuration. Moreover, compactness and manufacturing constraints need to be respected.

Here is a summary of the possible opto mechanical requirements which may depend on the application scenario:

Uniform light distribution inside the light guide at the entrance of the display active region, Narrow propagation angular spectrum inside light guide at the entrance of the display active region, Short primary optics (typically 4:1 ratio between the LED pitch L and the LED to display active area distance d).

According to FIGS. 4 and 5, a primary optics made of a light guide pre-section may be used which is hollowed out with air holes having a prismatic shape. The surface of these air holes deviate the light by either refraction or total internal reflection (TIR). By using an adequate configuration, the holes can redirect the light coming from the LEDs and achieve a uniform distribution at the entrance of the active area of the display, as well as provide a collimated angular spectrum.

FIG. 4 illustrates aspects of a further embodiment of the present invention. The (red) rays r coming from the source are reflected by the air prism and distributed along the entry section of the screen active region.

However, it should be noted that in FIG. 4, rays r are perpendicular to the LED. In reality, most to the LEDs have an angular emission spectrum which is close to Lambertian. In this case, part of the rays do not meet the air prisms under the TIR condition and are deviated by refraction instead of reflection. This phenomenon is illustrated by ray b of FIG. 5.

It should be noted that in certain embodiments of the present invention it is only the combination of TIR and refraction that allows having light all along the entry cross section of the display active area. For instance, if TIR was the working principle in the concept, there would be no light behind the prisms, resulting in dark regions in the display.

According to FIGS. 6 to 8, a further design parameter used to control the light distribution may be the modulation of the prism depth. The prisms can either be holes (go through), or grooves. Depending on the prism locations, grooves can also be useful to relax manufacturing constraints (i.e. plastic flow during injection molding).

As already mentioned, one goal of certain embodiments of the present invention may be to control the directivity of the rays and the uniformity distribution at the entrance of the light guide active area. The angular spectrum and uniformity constraints are application dependent. The LED pitch and the LED to display active area distance vary for each configuration. Therefore each application will have its own design, whose layout may vary considerably.

FIGS. 9 to 12 illustrate two different design architectures which achieve a good uniformity and angular distribution for a 4:1 L/D ratio. Only the section corresponding to one LED is shown.

For illustration of the working principle, the right figures shows the optical path of three different bundle of rays.

In addition to the provision of the optical element 10 as mentioned above, for the backlighting of liquid crystal displays—e.g. when using light emitting diodes or LEDs and light guides—two basic configurations for a second optical element 40—with some variations—can be applied. These two configurations are shown in FIGS. 16 and 17. Again, it should be noticed, that the provision of said second optical element 40 is only an additional measure to further enhance brightness and to increase uniformity.

Backlighting using two brightness enhancement films (BEF):

This configuration for a second optical element 40 is shown in the embodiment of FIG. 16. The function of the different constitutive components is summarized as follows:

1. The reflective sheet recycles the rays which are leaving the light guide through the bottom face.

2.a) The light guide body guides and/or transports the light by total internal reflection (TIR).

2.b) The out coupling μ-structures break the TIR and couple part of the rays out of the guide. These are the rays contributing to the illumination of the display.
3. Brightness enhancements films (BEFs) are used to direct the light toward the desired illumination angle. These films consists of an array of one dimensional prisms. In order to have a full control the cone of illumination, two cross BEFs may be generally used.
4. A diffuser sheet is used to increase the uniformity and eventually fine tune the angle of the illumination cone.

The BEF based configuration provides good uniformity and good control of the illumination cone. However, the use of two BEFs sheets makes this approach relatively expensive.

Backlighting using one reverse prism sheet:

This configuration for a second optical element 40 is shown in the embodiment of FIG. 17. The function of the different constitutive components is summarized here after:
1. The reflective sheet recycles the rays which are leaving the light guide through the bottom face.
2.a) The light guide body guides/transports the light by total internal reflection (TIR).
2.b) The out coupling μ-structures break the TIR and couple part of the rays out of the guide. These are the rays contributing to the illumination of the display.
2.c) The cylinder array on top of the light guide spreads the rays along the perpendicular direction of the cylinders. This allows the control of the illumination cone vs. one direction.
3. A reverse prisms sheet redirects the ray towards the main direction of illumination. The control of the illumination cone depends on the radius of curvature of the cylinder sheet (2c) and the prism angles of the reverse prism sheet (3).
4. A diffuser sheet is used to increase the uniformity and eventually fine tune the angle of the illumination cone.

The reverse prism configuration uses one prism sheet when compared with the two prism sheets of the (BEF) configuration. This may be a decisive cost advantage for many applications. Moreover, the reverse prism configuration may have a better optical efficiency that the BEF configuration (e.g. important for battery driven devices).

As the second optical element 40 is an additional measure, the following elucidates aspects of embodiments of the invention, which are also described in FIGS. 18 to 23:

In case of the BEF configuration, the illumination uniformity is controlled by the type and spatial distribution of the light guide out coupling i-structures. The control of the observation angle is done by the BEFs and the diffuser. The control of the uniformity and observation angle are clearly separated functions.

In case of the reverse prism configuration, the cylinders on top of the light guide do not only change the direction of the out coupled rays (wished effect), but also act on the out coupling. As the out coupling is produced by both, the light guide out coupling μ-structures (2b) and the light guide cylinders (2c), the uniformity of the illumination is difficult to control for all viewing conditions (all viewing angles). For example, bright/hot spots are observed close to the LEDs when observing the screen under oblique conditions.

The out coupling mechanisms are discussed as follows:
A) FIG. 18: In a parallelepiped (without μ-structures) light guide, the light is guided by total internal reflection. No light is coupled out, so no backlighting function is performed.
B) FIG. 19: Illumination by the out coupling μ-structures (2a). In this case, the propagation angle is modified by the μ-structures until the TIR condition is not fulfilled and the rays are coupled out of the light guide.
C) FIGS. 20-23: Out coupling by the cylinders array (2c). In case of cylinders, the (not desired) out coupling happens with the skew rays which may have an angle of incidence on the cylinder surface which is bigger than the TIR condition. Note that all rays meeting the cylinder surface change their direction of propagation. As a consequence, even rays under the TIR condition at one point may be out coupled after meeting the cylinders a few time (they become skew rays).

It should be noted that in the case of backlighting using LEDs, the direction of the rays is not uniformly distributed along the entry cross-section of the light guide. This non uniform angular distribution results in a non uniform out coupling by the cylinders, resulting in a non uniform lighting distribution. In other words this produces bright spots (also called hot spots) close to the LEDs.

Figure 24:
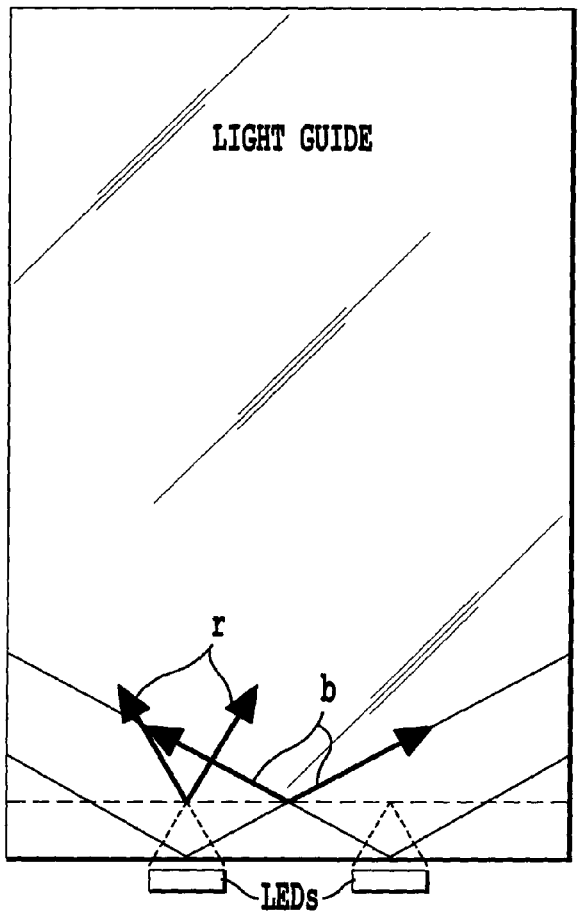
Figure 20:
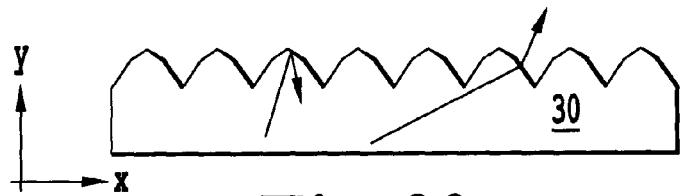
Figure 21:
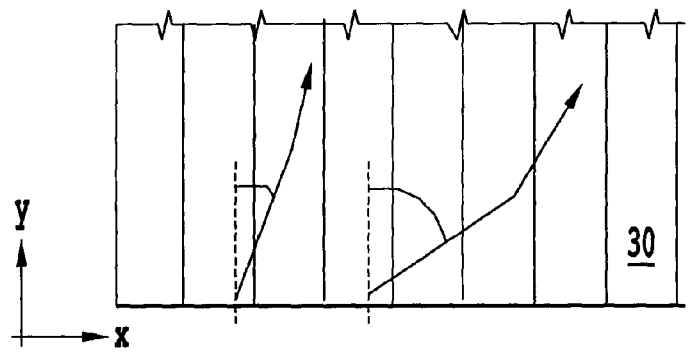
Figure 22:
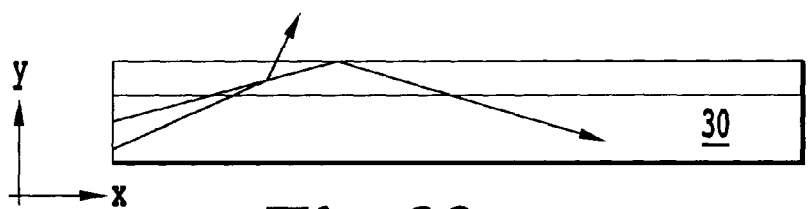
Figure 23:
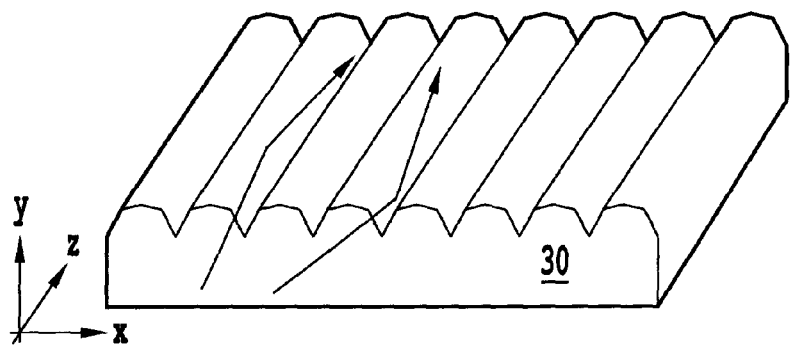

FIG. 24 shows two different angular spectra depending on the location. The large spectrum b will create a hot spot as the oblique rays are partially out coupled by the cylinder array. The narrow spectrum r propagates without creating a hot spot.

Embodiments of the present invention contribute to minimize or suppress the hot spots by reducing the angular spectrum of the rays propagating along the light pipe. This is achieved by an innovative optical architecture placed between the LEDs and the screen active region.

Further aspects and/or possible advantages (depending on the application scenario) are:
the fact that the control of uniformity and propagation angular spectrum is done on a short distance when compared to the LED pitch (typically 4:1 aspect ratio),
the fact that the primary optics can be manufactured with the light guide as a single block, and
the fact that the ray deviation is done by TIR and refraction. No reflective coating is needed.

The invention claimed is:

1. A spatial light modulator display, comprising:
an optical element configured to receive light and to transmit a first part of said light towards said liquid crystal display, said first part corresponds to at least a part of said light, said light has a first light distribution and said first part of said light has a second light distribution, said second light distribution is more uniform than said first light distribution,
said optical element including
a material body, and
at least one recess formed in said material body and configured to determine said second light distribution based on a redistribution of said first light distribution, said redistribution depends on refraction and reflection of said light at interfaces between said material body and said at least one recess.

2. The spatial light modulator display according to claim 1, further comprising:
a light guide including a light input interface and a light output interface, said light guide is configured to receive said first part of said light through said light input interface and to transmit a second part of said light towards said liquid crystal display through said light output interface, said second part corresponds to at least a part of said first part of said light.

3. The spatial light modulator display according to claim 2, wherein said material body is located before said light input interface.

4. The spatial light modulator display according to claim 1, wherein reflection of said light comprises total internal reflection of said light at said interfaces.

5. The spatial light modulator display according to claim 1, wherein said at least one recess is formed as a prism.

6. The spatial light modulator display according to claim 1, wherein said at least one recess has a triangular or other polygonal shape.

7. The spatial light modulator display according to claim 1, wherein said at least one recess is evacuated.

8. The spatial light modulator display according to claim 1, wherein said at least one recess is filled with a gas.

9. The spatial light modulator display according to claim 1, wherein said at least one recess is filled with a material which is at least partly transparent to said light and which has a refraction index which is below a refraction index of the material body.

10. Optical device according to claim 1, wherein said material body has an upper surface and a lower surface and said at least one recess is formed as a groove on at least one of said upper and lower surfaces.

11. The spatial light modulator display according to claim 1, wherein said material body has an upper surface and a lower surface, and said at least one recess is formed as a recess extending between said upper and lower surfaces.

12. The spatial light modulator display according to claim 1, wherein said material body has an upper surface and a lower surface, and said at least one recess is formed as a recess in the interior of said material body spatially separated from said upper and lower surfaces.

13. The spatial light modulator display according to claim 1, wherein said material body has a square or trapezoidal shape.

14. The spatial light modulator display according to claim 1, further comprising:
a recess which is formed as a Fresnel block.

15. The spatial light modulator display according to claim 1, further comprising:
a liquid crystal display, and
a light source (20) configured to generate said light, and wherein
said optical element is further configured to receive said light from said light source (20) and to illuminate said liquid crystal display.

16. The spatial light modulator display according to claim 15, wherein said light source comprises at least one of light emitting diode.

17. The spatial light modulator display according to claim 15, further comprising:
a second optical element configured to enhance the brightness or to make uniform the light distribution of received light.

18. A liquid crystal display device, comprising:
a liquid crystal display;
a light source (20) configured to generate light; and
an optical device including an optical element, said optical element is configured to receive said light and to transmit a first part of said light towards said liquid crystal display, said first part corresponds to at least a part of said light, said light has a first light distribution and said first part of said light has a second light distribution, said second light distribution is more uniform than said first light distribution,
said optical element including
a material body, and
at least one recess formed in said material body and configured to determine said second light distribution based on a redistribution of said first light distribution, said redistribution depends on refraction and reflection of said light at interfaces between said material body and said at least one recess.

19. A method for backlighting a liquid crystal display, comprising:
receiving light having a first light distribution;
transmitting a first part of said light towards said liquid crystal display,
receiving said light at an optical element; and
transmitting said first part of said light towards said liquid crystal display, said first part corresponding to at least a part of said light, said light having a first light distribution and said first part of said light having a second light distribution, said second light distribution being more uniform than said first light distribution, said optical element including a material body;
forming at least one recess in said material body for determining said second light distribution based on a redistribution of said first light distribution, said redistribution depending on refraction and reflection of said light at interfaces between said material body and said at least one recess.

* * * * *